United States Patent
Zhao et al.

(10) Patent No.: US 10,156,942 B2
(45) Date of Patent: Dec. 18, 2018

(54) IN-CELL TOUCH SCREEN PANEL AND DISPLAY DEVICE FOR DRIVING DISPLAY AND TOUCH FUNCTIONS SIMULTANEOUSLY

(71) Applicant: BOE TECHNOLOGY GROUP CO., LTD., Beijing (CN)

(72) Inventors: Jiayang Zhao, Beijing (CN); Yinglong Huang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/787,384

(22) PCT Filed: Mar. 27, 2015

(86) PCT No.: PCT/CN2015/075221
§ 371 (c)(1),
(2) Date: Oct. 27, 2015

(87) PCT Pub. No.: WO2016/058337
PCT Pub. Date: Apr. 21, 2016

(65) Prior Publication Data
US 2016/0195956 A1  Jul. 7, 2016

(30) Foreign Application Priority Data
Oct. 13, 2014  (CN) .......................... 2014 1 0540073

(51) Int. Cl.
G09G 3/36   (2006.01)
G06F 3/044  (2006.01)
G06F 3/041  (2006.01)

(52) U.S. Cl.
CPC ............ G06F 3/044 (2013.01); G06F 3/0412 (2013.01); G06F 3/0416 (2013.01);
(Continued)

(58) Field of Classification Search
CPC ..... G09G 3/3655; G06F 3/044; G06F 3/0416; G06F 3/0412
(Continued)

(56) References Cited

U.S. PATENT DOCUMENTS

2003/0090599 A1* 5/2003 Ochiai ............. G02F 1/136213
349/39
2003/0133053 A1* 7/2003 Ono ................... G02F 1/134363
349/38
(Continued)

FOREIGN PATENT DOCUMENTS

CN       102478998 A    5/2012
CN       103163671 A    6/2013
(Continued)

OTHER PUBLICATIONS

Chinese Office Action dated Oct. 9, 2016.
(Continued)

*Primary Examiner* — Adam J Snyder
(74) *Attorney, Agent, or Firm* — Dilworth & Barrese, LLP; Michael J. Musella, Esq.

(57) ABSTRACT

An in-cell touch screen and a display device, a touch electrode pattern is disposed on a side of the opposite substrate (100) facing the array substrate (200); a data line (210) and a gate line (220) are disposed on a side of the array substrate (200) facing the opposite substrate (100), the data line (210) and the gate line (220) intercross and are mutually insulated from each other; and a common electrode layer (230) is disposed on a layer where the gate line and the data line are located; and an orthographic projection of the common electrode layer (230) on the array substrate (200) covers orthographic projections of the gate line (220) and the data line (210). The in-cell touch screen can avoid
(Continued)

various display problems and touch problems caused by insufficient time periods in a time division driving manner.

11 Claims, 5 Drawing Sheets

(52) U.S. Cl.
CPC .............. *G06F 2203/04107* (2013.01); *G06F 2203/04112* (2013.01); *G09G 3/3655* (2013.01)

(58) Field of Classification Search
USPC .......................................................... 345/104
See application file for complete search history.

(56) References Cited

U.S. PATENT DOCUMENTS

| | | | |
|---|---|---|---|
| 2003/0184699 A1* | 10/2003 | Matsumoto | G02F 1/134363 349/141 |
| 2004/0169627 A1* | 9/2004 | Hong | G09G 3/3696 345/89 |
| 2005/0110930 A1* | 5/2005 | Kim | G02F 1/134363 349/141 |
| 2008/0002126 A1* | 1/2008 | Lim | G02F 1/134309 349/141 |
| 2009/0109356 A1* | 4/2009 | Kitagawa | G02F 1/134363 349/33 |
| 2010/0007838 A1* | 1/2010 | Fujimoto | G02F 1/134363 349/139 |
| 2010/0201669 A1* | 8/2010 | Kim | G09G 3/3696 345/211 |
| 2012/0056834 A1* | 3/2012 | Kim | G06F 3/044 345/173 |
| 2012/0105337 A1* | 5/2012 | Jun | G06F 3/044 345/173 |
| 2012/0133599 A1 | 5/2012 | Cho | |
| 2012/0133865 A1* | 5/2012 | Yonemura | G02F 1/133512 349/96 |
| 2012/0146920 A1* | 6/2012 | Lin | G06F 3/041 345/173 |
| 2012/0274603 A1* | 11/2012 | Kim | G06F 3/044 345/174 |
| 2012/0315715 A1* | 12/2012 | Cho | G02F 1/1368 438/30 |
| 2013/0241873 A1* | 9/2013 | Kim | G06F 3/044 345/174 |
| 2013/0242221 A1* | 9/2013 | Nishida | G02F 1/1323 349/43 |
| 2013/0329156 A1* | 12/2013 | Hirosawa | G02F 1/134363 349/43 |
| 2013/0335342 A1* | 12/2013 | Kim | G06F 3/044 345/173 |
| 2014/0028535 A1* | 1/2014 | Min | G09G 3/3655 345/87 |
| 2014/0071386 A1* | 3/2014 | Ito | G02F 1/134363 349/110 |
| 2014/0362303 A1* | 12/2014 | Huang | G06F 3/041 349/12 |
| 2015/0054724 A1* | 2/2015 | Wang | G09G 3/3696 345/98 |
| 2016/0026290 A1 | 1/2016 | Liu et al. | |

FOREIGN PATENT DOCUMENTS

| | | |
|---|---|---|
| CN | 103760708 A | 4/2014 |
| CN | 103838430 A | 6/2014 |
| CN | 104281352 A | 1/2015 |
| EP | 2182508 A1 | 10/2009 |
| JP | 2014164752 A | 9/2014 |

OTHER PUBLICATIONS

Search Report and Written Opinion dated Jul. 16, 2015 from State Intellectual Property Office of the P.R. China.
Second Chinese Office Action dated Feb. 16, 2017.
European Search Report dated May 3, 2018.

* cited by examiner

IN-CELL TOUCH SCREEN PANEL AND DISPLAY DEVICE FOR DRIVING DISPLAY AND TOUCH FUNCTIONS SIMULTANEOUSLY

TECHNICAL FIELD

Embodiments of the present invention relate to an in-cell touch screen panel and a display device.

BACKGROUND

With the rapid development of display technologies, touch screen panels have been widely applied in people's daily lives. Generally, according to structures, touch screen panels may be classified as: add-on mode touch panels, on-cell touch panels, and in-cell touch panels. A touch panel and a liquid crystal display, which are produced separately in advance, are combined to form a liquid crystal display panel with a touch function, so that an add-on mode touch panel is obtained. Add-on mode touch panels have disadvantages such as high production cost, low transparency, and big assembly thickness. An in-cell touch panel comprises touch electrodes of a touch panel within a liquid crystal display panel, and it has reduced thickness of the assembly and greatly decreased production cost for the touch panel, which characteristics favor panel manufacturers.

Generally, an in-cell touch panel utilizes the principle of mutual capacitance and self capacitance to implement detection of a position where a finger touches. Generally, the pattern of touch electrodes is added in the touch panel. In order to avoid mutual interference between touch signals applied by the touch electrodes and normal display signals in the touch panel, a touch function and a display function are generally driven in a time division manner. In this case, however, a time period for touching and a time period for displaying in one frame are relatively short. Because the time period is not sufficient in the time division manner when a high resolution display is required, various display problems and touch problems appear.

SUMMARY

Embodiments of the invention provides an in-cell touch screen and a display device for avoiding various display problems and touch problems caused by insufficient time periods for a touch function and a display function in a time division driving manner for an in-cell touch screens.

At least one embodiment of the invention provides an in-cell touch screen, comprising an opposite substrate and an array substrate disposed oppositely; a touch electrode pattern is disposed on a side of the opposite substrate, which side faces the array substrate; a data line and a gate line are disposed on a side of the array substrate, which side faces the opposite substrate, the data line and the gate line intercross and are mutually insulated from each other; and a common electrode layer is disposed on a layer where the gate line and the data line are located; an orthographic projection of the common electrode layer on the array substrate covers orthographic projections of the gate line and the data line on the array substrate.

For example, a feedback compensation circuit for providing a common electrode signal to the common electrode layer is further disposed on the array substrate.

For example, the feedback compensation circuit comprises: a first operational amplifier, a second operational amplifier, a first resistor, a second resistor and a filtering capacitor.

For example, a positive input terminal of the first operational amplifier is connected to a common electrode signal standard voltage providing terminal, a negative input terminal thereof is connected to an end of the first resistor, an output terminal is connected to a common electrode signal input terminal; the second resistor is connected in parallel between the negative input terminal of the first operational amplifier and the output terminal; a positive input terminal of the second operational amplifier is connected to a common electrode signal feedback terminal of the common electrode layer, a negative input terminal thereof is connected to an output end thereof, and the output terminal is connected to the other end of the first resistor through the filtering capacitor.

For example, resistance values of the first resistor R1 and the second resistor R2 meet the following relationship:

$$\frac{R1}{R2} = \frac{(Vcom\_feed - Vcom\_standard)}{(Vcom\_input - Vcom\_standard)}$$

where "Vcom_feedback" refers to a voltage value of a common electrode signal feedback terminal received by the positive terminal of the second operational amplifier, "Vcom_input" refers to a voltage value applied by the output terminal of the first operational amplifier to the common electrode signal input terminals, and "Vcom_standard" refers to a voltage value of the common electrode signal standard voltage providing terminal received by the positive terminal of the first operational amplifier.

For example, the common electrode signal feedback terminal is disposed in an area in the common electrode layer with the largest signal latency.

For example, in a case the common electrode signal input terminals are located on both a left side and a right side of the common electrode layer, the common electrode signal feedback terminal is disposed at a central position of a base on a side of the common electrode layer way from the feedback compensation circuit.

For example, in a case where the common electrode signal input terminals are respectively located on the left side or the right side of the common electrode layer, the common electrode signal feedback terminal is disposed at a corner position, on the right side or the left side and opposite to the common electrode signal input terminals, of the common electrode layer.

For example, the in-cell touch screen further comprises a touch detection circuit and a de-noise circuit, a first input terminal of the de-noise circuit is configured to receive the touch signal of the touch electrode pattern, a second input terminal is configured to receive a noise signal of the common electrode signal feedback terminal, a output terminal of the de-noise circuit is connected to an input terminal of the touch detection circuit, the de-noise circuit is configured to de-noise the received touch signal and then output it to the touch detection circuit.

For example, a black matrix pattern is further disposed on the side of the opposite substrate, which side faces the array substrate; an orthographic projection of the touch electrode pattern on the opposite substrate is fully located within an area where an orthographic projection of the black matrix pattern on the opposite substrate locates.

For example, the touch electrode pattern is a self capacitive electrode pattern or a mutual capacitive electrode pattern.

An embodiment of the invention further provides a display device, comprising the in-cell touch screen described by any one of the above embodiments.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

REFERENCE NUMBER

100—opposite substrate; 110—touch electrode pattern; 200—array substrate; 210—data line; 220—gate line; 230—common electrode layer; 240—pixel electrode; 250—feedback compensation circuit; 600—de-noise circuit; 601—first input terminal of de-noise circuit; 602—second input terminal of de-noise circuit; 603—output terminal of de-noise circuit; 700—touch detection circuit

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Thickness and shape of each of the layers in figures are not in real scale, the purpose of which is merely for illustration of the description.

Figure 1A:
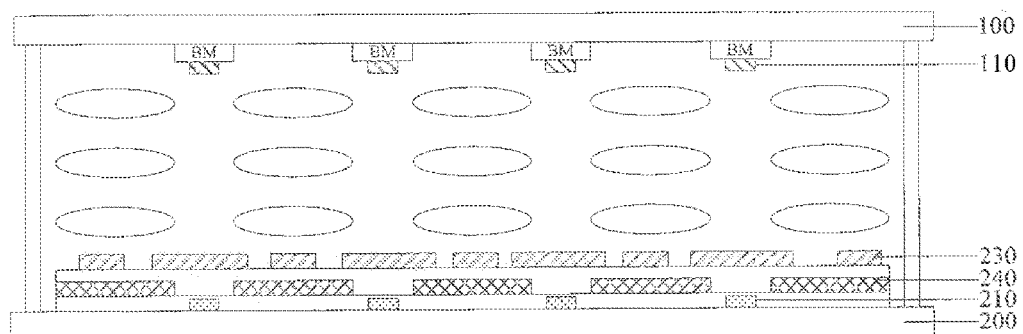
FIG. 1a is a schematic view of a lateral cross-section view of an in-cell touch screen provided by an embodiment of the invention.
Figure 1B:
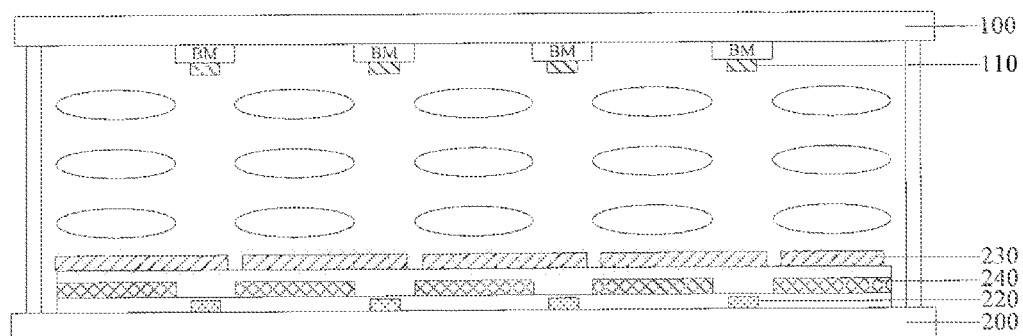
FIG. 1b is a schematic view of a longitudinal cross-section view of the in-cell touch screen provided by an embodiment of the invention.

FIG. 1a is a schematic view of a lateral cross-section view of an in-cell touch screen provided by an embodiment of the invention, and FIG. 1b is a schematic view of a longitudinal cross-section view of the in-cell touch screen provided by the embodiment of the invention. As shown in FIG. 1a and FIG. 1b, the in-cell touch screen provided by the embodiment of the invention includes an opposite substrate 100 and an array substrate 200 disposed oppositely.

A touch electrode pattern 110 is disposed on a side of the opposite substrate 100, which side faces the array substrate 200. A data line 210 and a gate line 220 are disposed on a side of the array substrate 200, which side faces the opposite substrate 100, and the data line 210 and the gate line 220 intercross and are mutually insulated from each other. A common electrode layer 230 is disposed on a layer where the gate line 220 and the data line 210 are located. That is, the common electrode layer 230 is closer to the opposite substrate 100 than the gate line 220 and the date line 210. An orthographic projection of the common electrode layer 230 on the array substrate 200 covers orthographic projections of the gate line 220 and the data line 210 on the array substrate 200.

Figure 1C:
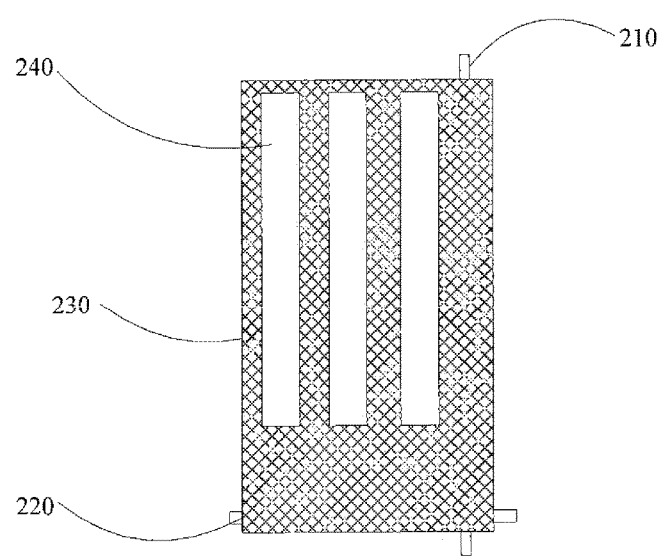
FIG. 1c is a top view of the in-cell touch screen provided by an embodiment of the invention.

The in-cell touch screen provided by the embodiment of the invention disposes the common electrode layer 230 above the data line 210 and the gate line 220 and below the touch electrode pattern 110, as shown in FIG. 1c. The gate line 220 and the date line 210 are fully covered by the common electrode layer 230. In this way, the shielding effect of the common electrode layer 230 can eliminate interference by display signals of the gate line 220 and the date line 210 on touch signals, and also the shielding effect of the common electrode layer 230 can eliminate interference by the touch signals of the touch electrode pattern 110 on the display signals. Thus, the in-cell touch screen provided by the embodiment of the invention can employ a manner of driving a display function and a touch function at the same time, and therefore avoiding various display problems and touch problems, during high resolution displaying, caused by insufficient time periods for the touch function and the display function in the time division driving manner.

For example, the touch screens provided by embodiments of the invention may be applied to In-Plane Switch (IPS) technology and Advanced Super Dimension Switch (ADS) technology. The above FIG. 1a and FIG. 1b illustrate an example in an ADS mode. That is, in the ADS mode, a pixel electrode 240 on the array substrate 200 is disposed on a layer different from the common electrode layer 230. FIG. 1a and FIG. 1b illustrate the example in which the common electrode layer 230 is disposed above the pixel electrode 240. Obviously, the pixel electrode 240 may be disposed above the common electrode 230, the description of which is omitted herein. The gate line 220 and the data line 210 are generally formed on different layers or on the same layer.

Figure 2:
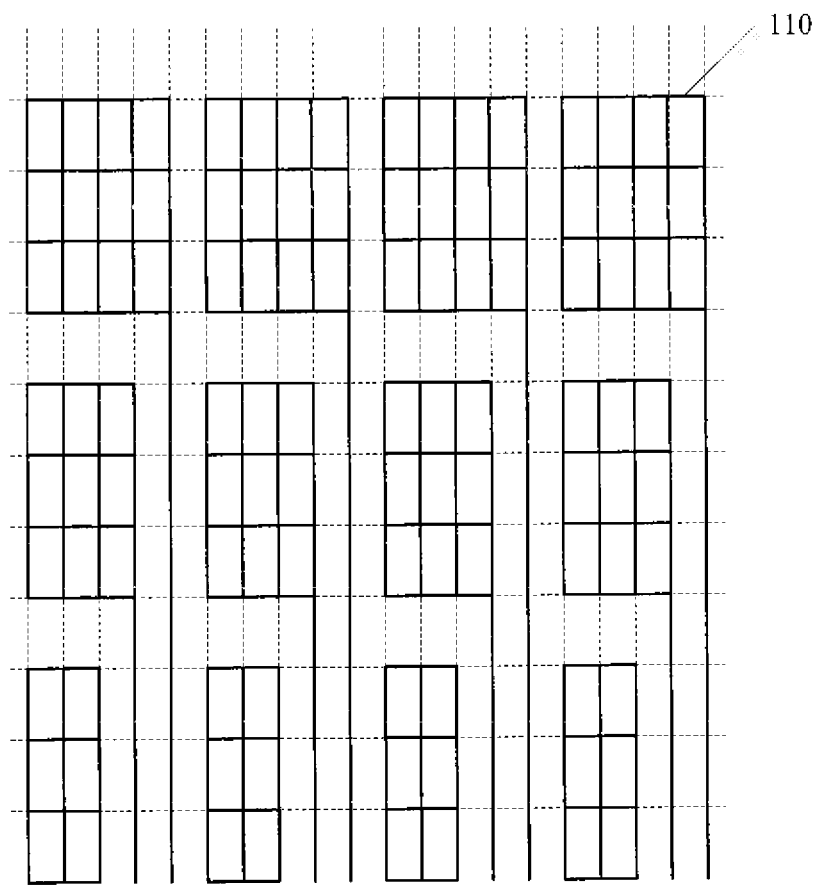
FIG. 2 is a schematic view of a touch electrode pattern of the in-cell touch screen provided by an embodiment of the invention.

For example, the above-described touch screen provided by the embodiment of the invention may implement the touch function in accordance with the principle of mutual capacitance or the principle of self capacitance. That is, the touch electrode pattern disposed on the opposite substrate 100 may be implemented as a self capacitive electrode pattern or a mutual capacitive electrode pattern. FIG. 2 shows a basic structural diagram of implementing the touch function in accordance with the principle of self capacitance.

Generally, a black matrix (BM) pattern is disposed on the side of the opposite substrate 100, which side faces the array substrate 200. In order to prevent the disposed touch electrode pattern 110 from affecting aperture ratio, the touch electrode pattern 110 is generally disposed in the following manner: an orthographic projection of the touch electrode pattern 110 on the opposite substrate 100 is fully located within an area where an orthographic projection of the black matrix (BM) pattern on the opposite substrate 100 is located.

Figure 3A:
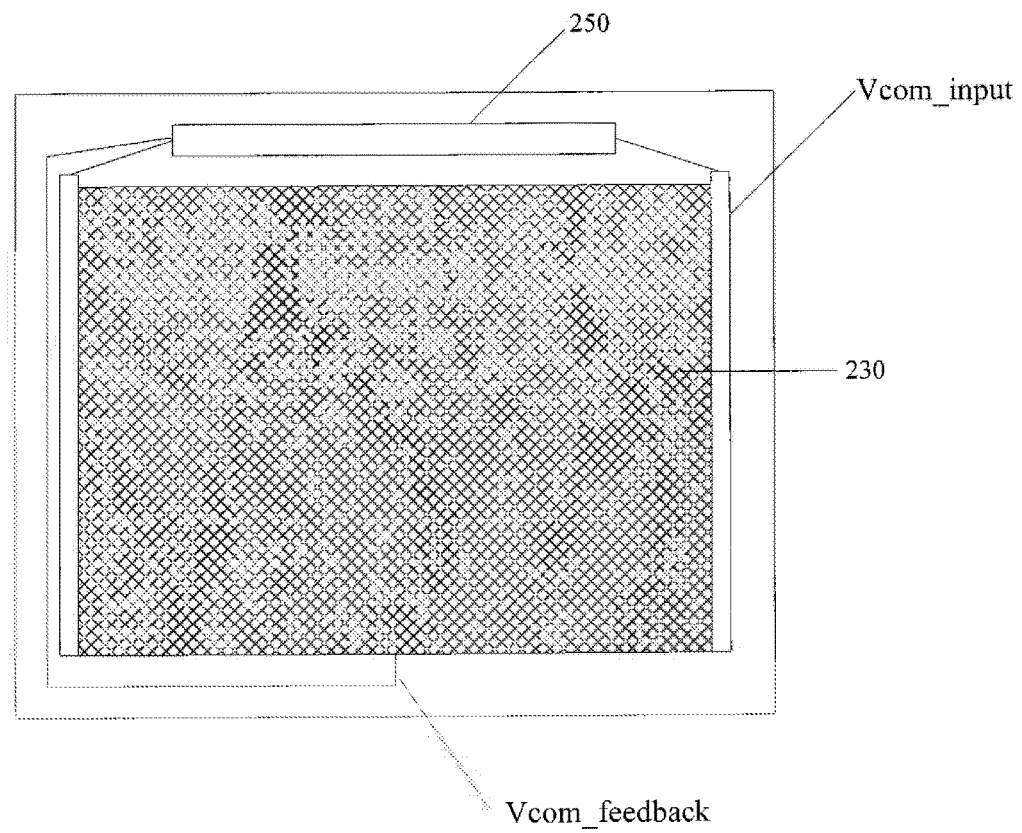
FIG. 3a and FIG. 3b are top views of the in-cell touch screen provided by an embodiment of the invention.
Figure 3B:
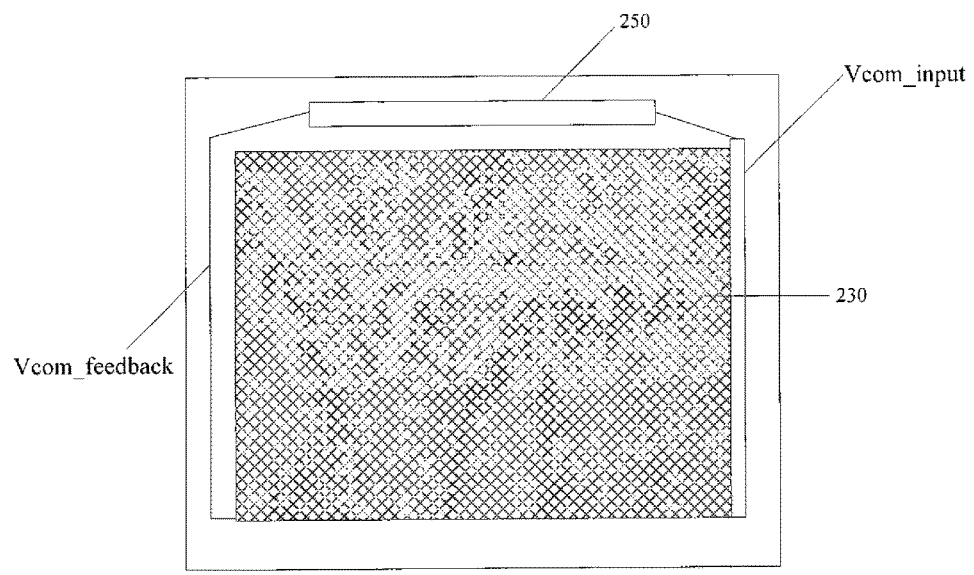

Furthermore, in the above-described in-cell touch screen provided by the embodiment of the invention, the data line 210, the gate line 220 and the common electrode layer 230 are all disposed on the array substrate 200. Thus, the data line 210 and the gate line 220 are provided too close to the common electrode layer 230, and thus it is inevitable to incur coupling effect, which effect causes the voltage on the common electrode layer 230 to fluctuate and in turn generates interference on the touch signals. In order to eliminate the interference on the touch signals due to the coupling effect, in the above-described in-cell touch screen provided by the embodiment of the invention, as shown in FIG. 3a and FIG. 3b, a feedback compensation circuit 250 for providing a common electrode signal to the common electrode layer 230 is further disposed on the array substrate 200. The feedback compensation circuit 250 can compensate the signal fluctuation over the common electrode layer 230 due to the coupling effect, so as to relatively stabilize the signal over the common electrode layer 230.

Figure 4:
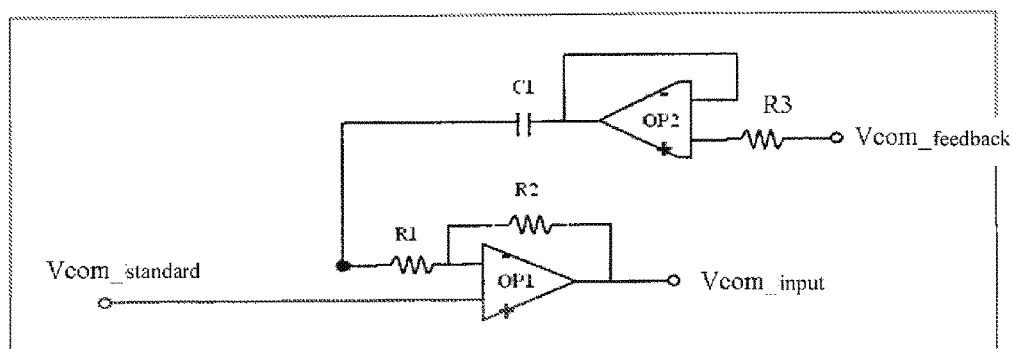
FIG. 4 is a schematic view of a feedback compensation circuit provided by n embodiment of the invention.

For example, as shown in FIG. 4, the feedback compensation circuit 250 comprises: a first operational amplifier OP1, a second operational amplifier OP2, a first resistor R1, a second resistor R2 and a filtering capacitor C1. R3 refers to a resistor in the panel.

A positive input terminal of the first operational amplifier OP1 is connected to a common electrode signal standard voltage providing terminal "Vcom_standard", a negative input terminal is connected to an end of the first resistor R1, an output terminal is connected to a common electrode signal input terminal "Vcom_input" for the common electrode 230; the second resistor R2 is connected in parallel between the negative input terminal of the first operational amplifier OP1 and the output terminal; a positive input terminal of the second operational amplifier OP2 is connected to a common electrode signal feedback terminal "Vcom_feedback" for the common electrode 230, a negative input terminal is connected to an output end thereof, and the output terminal is connected to the other end of the first resistor R1 via the filtering capacitor C1. The main function of the filtering capacitor C1 is to prevent signal interference of unnecessary frequency.

In the above feedback compensation circuit 250, the first resistor R1 and the second resistor R2 are proportional resistors. Resistance values of the first resistor R1 and the second resistor R2 meet the following relationship:

$$\frac{R1}{R2} = \frac{(Vcom\_feed - Vcom\_standard)}{(Vcom\_input - Vcom\_standard)}$$

Here, "Vcom_feedback" refers to a voltage value of the common electrode signal feedback terminal received by the positive terminal of the second operational amplifier; "Vcom_input" refers to a voltage value applied by the output terminal of the first operational amplifier to the common electrode signal input terminals; "Vcom_standard" refers to a voltage value of the common electrode signal standard voltage providing terminal received by the positive terminal of the first operational amplifier.

Figure 5:
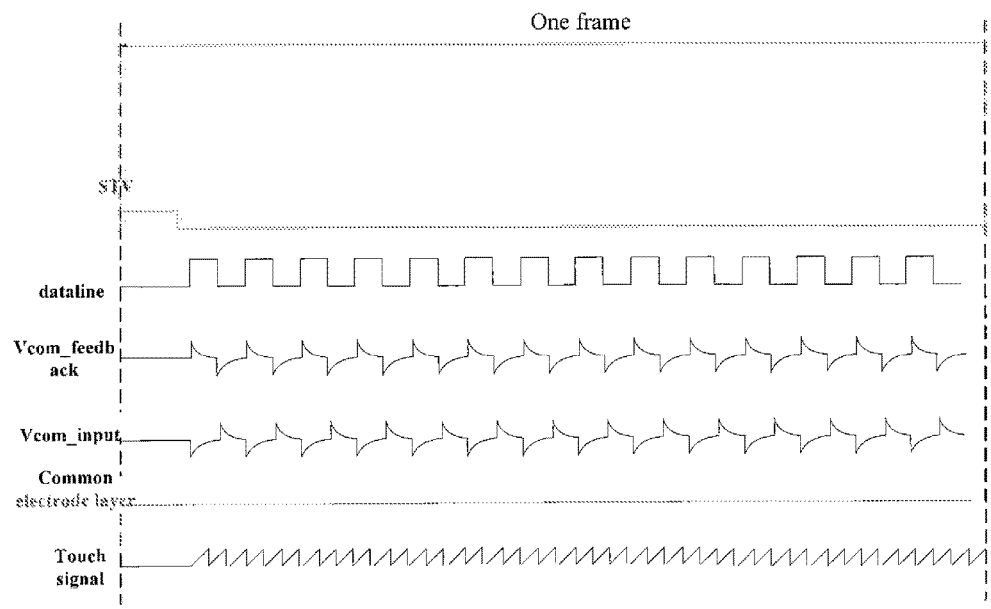
FIG. 5 is a wave diagram provided by an embodiment of the invention.

The minus sign in the above equation refers to an opposite direction. That is, a direction of voltage difference between "Vcom_feedback" and "Vcom_standard" is opposite to a direction of voltage difference between "Vcom_input" and "Vcom_standard", while the ratio of the voltage differences is R1/R2, so that a negative feedback for the compensation to Vcom is generated and the coupling effect in the common electrode layer 230 is lowered. For example, the ratio of R1 and R2 may be modified according to specific situation. Waveforms of signal terminals within one frame (STV) are shown in FIG. 5.

For example, the common electrode signal feedback terminal "Vcom_feedback" of the common electrode layer 230 connected with the feedback compensation circuit 250 provided by the embodiment of the invention is generally disposed in an area of the common electrode layer 230 where signal latency is the largest. Therefore, it ensures that the feedback compensation circuit 250 can eliminate noise influence to a greatest extend.

Further, the area of the common electrode layer 230 with the largest signal latency is related to a position where the signal input terminal "Vcom_input" of the common electrode in the common electrode layer 230 is disposed. As shown in FIG. 3a, in the case where the common electrode signal input terminals "Vcom_input" are respectively located on both the left side and the right side of the common electrode layer 230, the common electrode signal feedback terminal "Vcom_feedback" is generally disposed at the central position of a base of the common electrode layer 230 on the side away from the feedback compensation circuit 250. Also as shown in FIG. 3b, in the case where the common electrode signal input terminals "Vcom_input" are located on either the left side or the right side of the common electrode layer 230, the common electrode signal feedback terminal "Vcom_feedback" is disposed at a corner position, on the right side or the left side and opposite to the common electrode signal input terminals "Vcom_input", in the common electrode layer 230.

Furthermore, because in the above in-cell touch screen the common electrode layer 230 fully covers the gate line 220 and the data line 210, the noise of the display signal is essentially applied on the common electrode layer 230. Therefore, a feedback signal acquired from the common electrode signal feedback terminal "Vcom_feedback" in the common electrode layer 230 essentially reflects all forms of the noise. Thus, the feedback signal from the common electrode signal feedback terminal "Vcom_feedback" may be configured to be calculated with the touch signal to eliminate possible existence of the noise, so that the acquired touch signal and the display signal may not interfere with each other when they operates simultaneously, which guarantees accuracy of touching.

Figure 6:
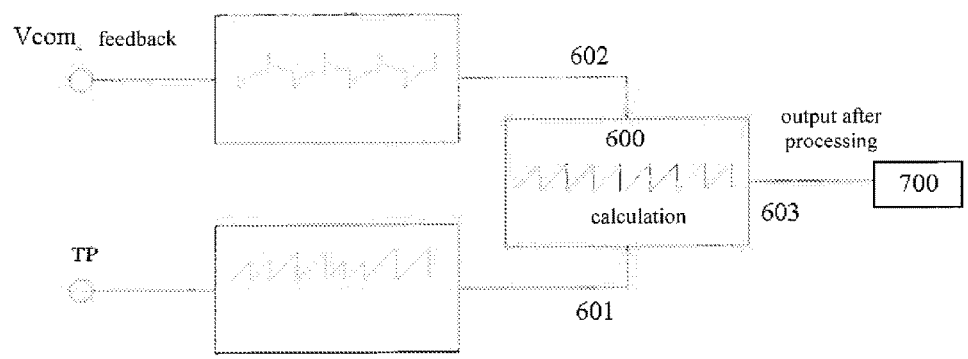
FIG. 6 is a schematic view of a de-noise circuit provided by an embodiment of the invention.

For example, the in-cell touch screen provided by an embodiment of the invention further includes: a touch detection circuit 700 and a de-noise circuit 600. As shown in FIG. 6, a first input terminal 601 of the de-noise circuit is configured to receive the touch signal TP of the touch electrode pattern, a second input terminal 602 thereof is configured to receive a noise signal of the common electrode signal feedback terminal "Vcom_feedback", a output terminal 603 of the de-noise circuit is connected to an input terminal of the touch detection circuit 700, the de-noise circuit 600 is configured to de-noise the received touch signal and then output the processed signal to the touch detection circuit 700. The de-noise circuit 600 is included in a de-noise module, and the touch detection circuit 700 is included in a touch positioning module.

Based on a same inventive concept, an embodiment of the invention provides a display device, including the in-cell touch screen provided by any one of the above embodiments. The display device may be: a cell phone, a watch, a tablet, a TV set, a display, a laptop, a digital frame, a navigator or any product or assembly with display function. The embodiment of the display device may be referred to any of the embodiments of the in-cell touch screen, description of which will be omitted herein.

An in-cell touch screen and a display device provided by the embodiments of the invention disposes a touch electrode pattern on a side of an opposite substrate, which side faces an array substrate; disposes a data line and a gate line on a side of the array substrate, which side faces the opposite substrate, the data line and the gate line intercross and are mutually insulated from each other; and disposes a common electrode layer on a layer where the gate line and the data line are located; and an orthographic projection of the common electrode layer on the array substrate covers orthographic projections of the gate line and the data line on the array substrate. Because the touch screen provided by an embodiment of the invention disposes the common electrode layer above the gate line and the data line and below the touch electrode, and the common electrode layer fully covers the gate line and the data line, so that the shielding effect of the common electrode layer eliminates interference of display signals of the gate line and the date line on touch signals, and also the shielding effect of the common electrode layer eliminates interference of the touch signals of the touch electrode pattern on the display signals. Thus, the touch screen provided by the embodiments of the invention can employ a manner of driving a display function and a touch function at the same time, avoiding various display problems and touch problems during high resolution displaying caused by insufficient time periods for the touch function and the display function in a time division driving manner.

The above description is merely about embodiments of the invention, and does not restrict the scope of the invention. Any alternation or replacement that occurs to those skilled in the art within the technical scope disclosed by the invention should fall in the scope of the invention. Thus, the scope of the invention should be defined by accompanying claims.

The application claims priority of Chinese Patent Application No. 201410540073.X filed on Oct. 13, 2014, the disclosure of which is incorporated herein by reference in its entirety as part of the present application.

The invention claimed is:

1. An in-cell touch screen, comprising: an opposite substrate and an array substrate disposed oppositely; wherein
   a touch electrode pattern is disposed on a side of the opposite substrate, which side faces the array substrate;
   a data line and a gate line are disposed on a side of the array substrate, which side faces the opposite substrate, the data line and the gate line intercross and are mutually insulated from each other; and
   a common electrode layer is disposed on a layer where the gate line and the data line are located; an orthographic projection of the common electrode layer on the array substrate fully covers orthographic projections of the gate line and the data line on the array substrate, wherein a feedback compensation circuit for providing a common electrode signal to the common electrode layer is further disposed on the array substrate;
   the feedback compensation circuit comprises: a first operational amplifier, a second operational amplifier, a first resistor, a second resistor and a filtering capacitor, wherein
   a positive input terminal of the first operational amplifier is connected to a common electrode signal standard voltage providing terminal, a negative input terminal thereof is connected to an end of the first resistor, an output terminal thereof is connected to a common electrode signal input terminal;
   the second resistor is connected in parallel between the negative input terminal and the output terminal of the first operational amplifier;
   a positive input terminal of the second operational amplifier is connected to a common electrode signal feedback terminal of the common electrode layer, a negative input terminal thereof is connected to an output end thereof, and the output terminal is connected to the other end of the first resistor through the filtering capacitor, wherein resistance values of the first resistor R1 and the second resistor R2 meet the following relationship:

$$\frac{R1}{R2} = \frac{(\text{Vcom\_feed} - \text{Vcom\_standard})}{(\text{Vcom\_input} - \text{Vcom\_standard})}$$

where "Vcom_feedback" refers to a voltage value of a common electrode signal feedback terminal received by the positive terminal of the second operational amplifier, "Vcom_input" refers to a voltage value applied by the output terminal of the first operational amplifier to the common electrode signal input terminals, and "Vcom_standard" refers to a voltage value of the common electrode signal standard voltage providing terminal received by the positive terminal of the first operational amplifier.

2. The in-cell touch screen according to claim 1, wherein the common electrode signal feedback terminal is disposed in an area in the common electrode layer with the largest signal latency.

3. The in-cell touch screen according to claim 2, wherein, in a case where the common electrode signal input terminals are located on both a left side and a right side of the common electrode layer, the common electrode signal feedback terminal is disposed at a central position of a base of the common electrode layer on a side away from the feedback compensation circuit.

4. The in-cell touch screen according to claim 3, further comprising a touch detection circuit and a de-noise circuit, wherein a first input terminal of the de-noise circuit is configured to receive touch signals of the touch electrode pattern, a second input terminal thereof is configured to receive noise signals of the common electrode signal feedback terminal, a output terminal of the de-noise circuit is connected to an input terminal of the touch detection circuit, the de-noise circuit is configured to de-noise the received touch signals and then output processed signals to the touch detection circuit.

5. The in-cell touch screen according to claim 2, wherein, in a case where the common electrode signal input terminals are respectively located on the left side or the right side of the common electrode layer, the common electrode signal feedback terminal is disposed at a corner position, on the right side or the left side and opposite to the common electrode signal input terminals, of the common electrode layer.

6. The in-cell touch screen according to claim 5, further comprising a touch detection circuit and a de-noise circuit, wherein a first input terminal of the de-noise circuit is configured to receive touch signals of the touch electrode pattern, a second input terminal thereof is configured to receive noise signals of the common electrode signal feedback terminal, a output terminal of the de-noise circuit is connected to an input terminal of the touch detection circuit, the de-noise circuit is configured to de-noise the received touch signals and then output processed signals to the touch detection circuit.

7. The in-cell touch screen according to claim 2, further comprising a touch detection circuit and a de-noise circuit, wherein a first input terminal of the de-noise circuit is configured to receive touch signals of the touch electrode pattern, a second input terminal thereof is configured to receive noise signals of the common electrode signal feedback terminal, a output terminal of the de-noise circuit is connected to an input terminal of the touch detection circuit, the de-noise circuit is configured to de-noise the received touch signals and then output processed signals to the touch detection circuit.

8. The in-cell touch screen according to claim 1, further comprising a touch detection circuit and a de-noise circuit, wherein a first input terminal of the de-noise circuit is configured to receive touch signals of the touch electrode pattern, a second input terminal thereof is configured to receive noise signals of the common electrode signal feedback terminal, a output terminal of the de-noise circuit is connected to an input terminal of the touch detection circuit, the de-noise circuit is configured to de-noise the received touch signals and then output processed signals to the touch detection circuit.

9. The in-cell touch screen according to claim 1, wherein a black matrix pattern is further disposed on the side of the opposite substrate, which side faces the array substrate; an orthographic projection of the touch electrode pattern on the opposite substrate is fully located within an area where an orthographic projection of the black matrix pattern on the opposite substrate locates.

10. The in-cell touch screen according to claim 9, wherein the touch electrode pattern is a self capacitive electrode pattern or a mutual capacitive electrode pattern.

11. A display device, comprising the capacitive in-cell touch screen according to claim 1.

* * * * *